March 17, 1925.                                                    1,530,135
C. F. MORGAN
INSECT TRAP
Filed March 12, 1924          2 Sheets-Sheet 2
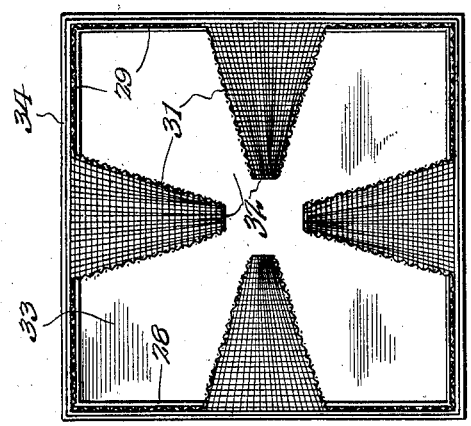
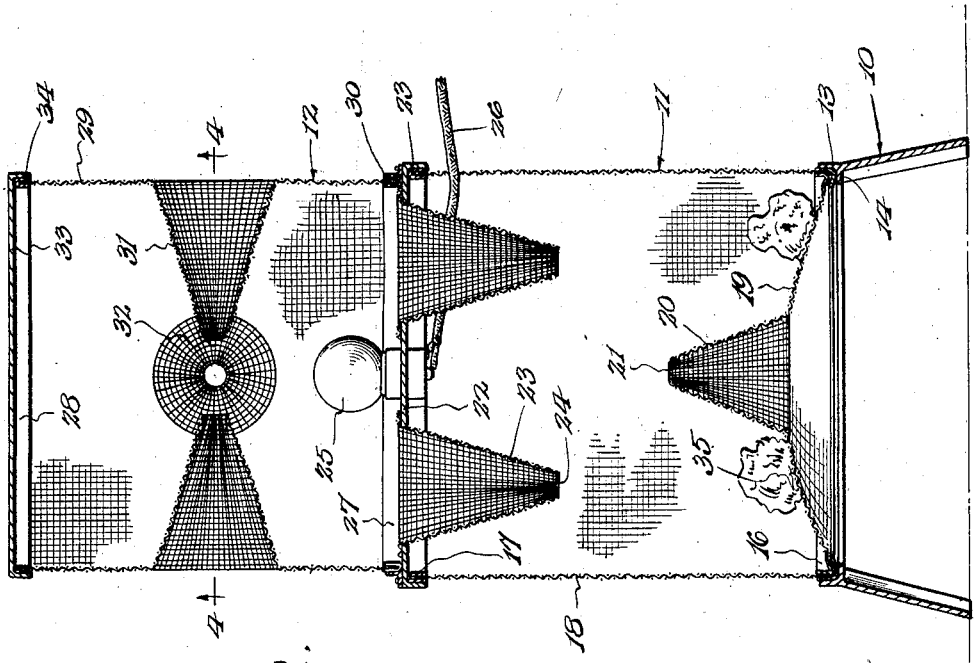

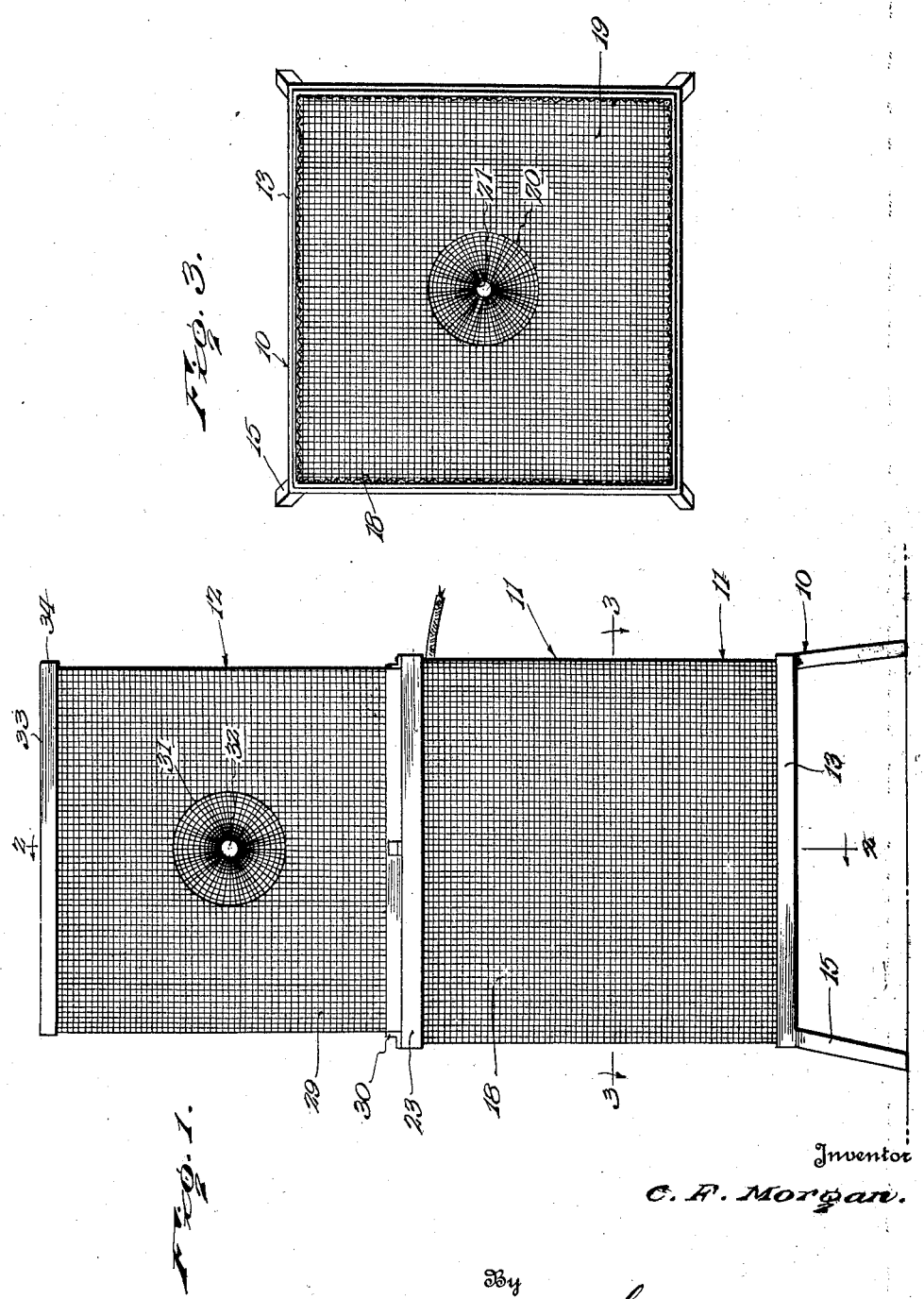

Patented Mar. 17, 1925.

1,530,135

UNITED STATES PATENT OFFICE.

CHARLES F. MORGAN, OF JACKSON, TENNESSEE.

INSECT TRAP.

Application filed March 12, 1924. Serial No. 698,683.

*To all whom it may concern:*

Be it known that I, CHARLES F. MORGAN, a citizen of the United States, residing at Jackson, in the county of Madison and State of Tennessee, have invented certain new and useful Improvements in Insect Traps, of which the following is a specification.

My invention relates to an insect trap for catching flies, mosquitoes, moths and boll weevils, or other insects.

One object of the invention is to construct a trap that operates automatically both night and day, or in other words, the trap is adapted to receive a suitable bait for the kind of insects that is to be caught and is also provided with a light for attracting the insects at night. The trap is very simple in construction and may be easily set up in any suitable place where most needed.

In the accompanying drawings, one embodiment of the invention is illustrated, and—

Figure 1 is a front elevation of the trap ready for use;

Figure 2 is a vertical section along line 2—2 of Fig. 1;

Figure 3 is a horizontal section along line 3—3 of Fig. 1, and

Figure 4 is a similar section along line 4—4 of Fig. 2.

The trap consists of three main parts, that is to say, a stand 10, a lower box 11 and an upper box 12 all assembled as indicated in Figs. 1 and 2. The stand 10 has a square or circular frame 13 fitting the bottom of the lower box 11 which rests on a ledge 14 in the frame. The stand has three or more legs 15 of sufficient height to raise the trap from the ground to permit the insects to crawl under the bottom of the lower box 11.

The lower box 11 has a bottom frame 16 preferably made of angular bands fitting in the frame 13 of the stand. The lower box has also an upper frame 17 of the same contour as the lower frame and between these two frames is stretched wire mesh 18 forming the sides of the box. The lower box 11 is open at the top but closed by a wire mesh bottom 19 secured in the bottom frame 16. This bottom 19 is preferably convex, as best seen in Fig. 2, and terminates centrally with a cone-shaped funnel 20 also of wire mesh and which is provided with a small opening 21 at its apex, situated slightly below the center of the box.

The top opening of the lower box 11 is closed by a roof 22 which is made of bright tin or other reflecting material and has downwardly extending side flanges 23 engaging around the frame 17 of the lower box. Two or more circular apertures are provided in the roof 22 and these apertures are filled by inverted cone-shaped funnels 23 also made of wire mesh, each having a small opening 24 at its apex. Centrally in the roof 22 is secured a small lamp 25 represented in Fig. 2 as an electric bulb with suitable conductors 26, but it is evident that other artificial light may be used instead of electricity. The upper box 12 is of similar construction as that of the lower box and has a bottom frame 27 of metallic band and an upper frame 28 similarly constructed and between which two frames wire mesh 29 is stretched. The upper box 12 stands upon the roof 22 of the lower box, and is removably held in position by a surrounding ledge 30 secured on the roof 22 so that it may be lifted therefrom. Each of the side walls of the upper box has a centrally located cone-shaped funnel 31 terminating with a small opening 32 and the top frame 28 of the box being open is provided with a cover 33 having flanges 34 fitting around the upper frame 28. The cover 33 is made of bright metal similar to the roof 22 so as to provide a reflection surface for the light 25.

The side walls of the box have all been shown as flat and straight, but they may be convexed in the same manner as the bottom 19 of the lower box in order to guide the insects into the funnels 31. As has already been stated, the boxes 11 and 12 are detachable from the bottom 19, roof 22 and cover 33 in order to facilitate baiting and cleaning.

When the insect trap is going to be used during the day a suitable bait 35 is placed on the bottom 19. Different bait is used for the different kinds of insects to be attracted. In the day most of the insects would enter through the bottom funnel 20 as being nearest the bait 35 but it is evident that insects entering through the upper box funnels 31 have also free access through the roof funnels 23 in the bottom box 11.

At night the light 25 is lit and most of the insects will then naturally enter in the funnel 31 in the upper box 12 but as the light is reflected downward by the cover 33 through the funnels 23 into the lower box, some insects would also enter through the bottom funnel 20 and in this manner be caught in the lower box as it is unlikely they would find their way to the small opening 24 through the roof funnel 23.

The material best suited for the construction of the trap is fine mesh or so-called mosquito wire screen which may be made of iron, copper, or other metal, or ordinary cotton mosquito netting may be used.

The trap may have a round or square cross section or, if a more ornamental design is required, may be built up in panels which carry inwardly directed funnels. The cover and the roof may be made of any bright sheet metal having a good reflecting surface.

Having thus described the invention, what is claimed as new is:

1. An insect trap comprising a stand having an inwardly projecting ledge at its top, a lower box resting on the ledge of the stand and having an entrance through its bottom, a roof for said lower box, an upper box mounted upon the roof of the lower box, the side walls of both boxes being of wire mesh, a ledge on the roof removably retaining the upper box thereon, funnels depending from said roof, entrances in the sides of the upper box, and a closed cover for the upper box.

2. An insect trap comprising a stand, a lower box mounted on said stand and an upper box mounted upon said lower box, the side walls and bottom of said lower box being made of wire mesh, the side walls of the upper box being made of the same kind of material, said bottom and walls having inwardly directed funnels also of wire mesh and opening inwardly in said boxes, a roof member for said lower box provided with similar funnels opening into the lower box, a cover for said upper box, said roof member and cover being made of reflecting material, and a lamp carried by said roof member.

In testimony whereof I affix my signature.

CHARLES F. MORGAN. [L. S.]